(12) United States Patent
Iizuka et al.

(10) Patent No.: US 7,916,329 B2
(45) Date of Patent: Mar. 29, 2011

(54) PRINT JOB MANAGEMENT DEVICE, PRINT JOB MANAGEMENT METHOD AND RECORDING MEDIUM

(75) Inventors: Koji Iizuka, Hata-machi (JP); Akio Murata, Matamoto (JP)

(73) Assignee: Seiko Epson Corporation, Tokyo (JP)

(*) Notice: Subject to any disclaimer, the term of this patent is extended or adjusted under 35 U.S.C. 154(b) by 1108 days.

(21) Appl. No.: 11/654,066

(22) Filed: Jan. 16, 2007

(65) Prior Publication Data

US 2007/0165275 A1 Jul. 19, 2007

(30) Foreign Application Priority Data

Jan. 16, 2006 (JP) ................. 2006-007156

(51) Int. Cl.
*G06F 15/00* (2006.01)
*G06F 15/16* (2006.01)
(52) U.S. Cl. ...................... 358/1.15; 709/203
(58) Field of Classification Search .............. 358/1.15, 358/1.13, 1.14, 1.16, 1.18, 474, 403, 400, 358/509, 504, 453, 1.9; 709/203, 219, 238, 709/223, 225, 246; 399/13; 382/162, 100, 382/107
See application file for complete search history.

(56) References Cited

U.S. PATENT DOCUMENTS

| 5,467,434 | A | * | 11/1995 | Hower et al. ................. 358/1.15 |
| 2004/0059995 | A1 | | 3/2004 | Takabayashi et al. |
| 2005/0267797 | A1 | | 12/2005 | Takahashi et al. |

FOREIGN PATENT DOCUMENTS

| JP | 11-194900 A | 7/1999 |
| JP | 2001-138607 A | 5/2001 |
| JP | 2003-208278 A | 7/2003 |
| JP | 2004-091061 A | 3/2004 |
| JP | 2004-284258 A | 10/2004 |
| JP | 2005-346180 A | 12/2005 |

* cited by examiner

*Primary Examiner* — Saeid Ebrahimi Dehkordy
(74) *Attorney, Agent, or Firm* — Nutter McClennen & Fish LLP; John J. Penny, Jr.; Michael P. Visconti, III

(57) ABSTRACT

A print job management device includes: a print job receiver, operable to receive a print job including print setting information on a setting of a printing operation to be executed by a printing device from a print job preparing device for preparing the print job; an acquirer, operable to acquire device status information on a status of the printing device from the printing device; and a print job issuer, operable to determine, based on the print setting information and the device status information, whether the printing operation can be performed by the printing device, the print job issuer issuing the print job to the printing device when the print job issuer determines that the printing operation cannot be performed by the printing device and the device status information indicates a predetermined status regarding a feed path and a printing medium of the printing device.

11 Claims, 11 Drawing Sheets

FIG. 9

PRINT JOB MANAGEMENT DEVICE, PRINT JOB MANAGEMENT METHOD AND RECORDING MEDIUM

BACKGROUND

1. Technical Field

The present invention relates to a print job management device, a print job management method and a recording medium, and more particularly, to a print job management device, a print job management method and a recording medium, which can efficiently manage a printing operation using a variety of printing medium feeding methods including a manual printing medium feeding method instructed by a print job.

2. Related Art

A variety of printing systems have been widely spread which can edit and print images photographed by an image capturing device such as a digital camera. In such printing systems, the photographed images are processed by a variety of print services using templates which can edit a layout of the photographed images in the form of a post card or an album.

In such printing systems, printers print the edited images or the like on printing papers while print job management devices such as print job management servers manage a variety of print jobs, on the basis of the print jobs including setting information of printing conditions in the print services. Accordingly, in the printing systems, it is possible to simply print processed images automatically or by a selected printer in shops such as photograph studios having a plurality of printers on the basis of the prepared print job.

Such printing systems specifically have the following configuration. That is, a printing system sets whether a printing paper should be checked, when a print job preparing device as a higher-ranked device allows a printer as a lower-ranked device to perform a printing operation on the basis of a user's printing instruction. The print job preparing device prepares a print job based on the setting and transmits the prepared print job to the printer.

When the setting required for checking a printing paper is performed in the print job at the time of starting the printing operation based on the print job received from the print job preparing device, the printer pauses the printing operation based on the print job. In addition, the printer checks the printing paper on the basis of the setting for checking the printing paper which is included in the print job.

The printer restarts the printing operation based on the paused print job when checking that the user's checking for the printing paper is finished in the process of checking the printing paper. Accordingly, the printing system has a configuration which can reduce a user's burden by removing a printing operation on an erroneous printing paper when a printing operation is performed in which different printing papers are mixed in paper feed methods other than a manual paper feed method (for example, see JP-A-2004-284258).

However, in the related printing systems, the print jobs are not appropriately managed by the print job management device. Accordingly, when the manual paper feed method is set (selected) as a paper feed method, it is not possible to surely remove the printing operation on an erroneous printing paper. For example, when performing printing operations based on other print jobs prepared by a plurality of users, it is necessary to perform the printing operations after the users check the paper feed method or the printing paper every time. Accordingly, it is difficult to generally reduce the user's burden.

SUMMARY

An advantage of some aspects of the invention is to provide a print job management device, a print job management method, and a recording medium which can reduce a user's burden by appropriately managing and efficiently performing a print job with removing a printing operation on an erroneous printing paper when performing the printing operation in which different printing papers are mixed in all paper feed methods including a manual paper feed method.

According to an aspect of the invention, there is provided a print job management device comprising: a print job receiver, operable to receive a print job including print setting information on a setting of a printing operation to be executed by a printing device from a print job preparing device for preparing the print job; an acquirer, operable to acquire device status information on a status of the printing device from the printing device; and a print job issuer, operable to determine, based on the print setting information and the device status information, whether the printing operation can be performed by the printing device, the print job issuer issuing the print job to the printing device when the print job issuer determines that the printing operation cannot be performed by the printing device and the device status information indicates a predetermined status regarding a feed path and a printing medium of the printing device.

BRIEF DESCRIPTION OF THE DRAWINGS

The invention will be described with reference to the accompanying drawings, wherein like numbers reference like elements.

FIG. 9 is a flowchart illustrating an example of a status display picture in the print job management device.

DESCRIPTION OF EXEMPLARY EMBODIMENTS

Hereinafter, a print job management device, a print job management method, a print job management program and a recording medium according to exemplary embodiments of the present invention will be described in detail with reference to the attached drawings.

Embodiments (Schematic Configuration of Large-Scaled Printing System Having Print Job Management Device)

Figure 1:
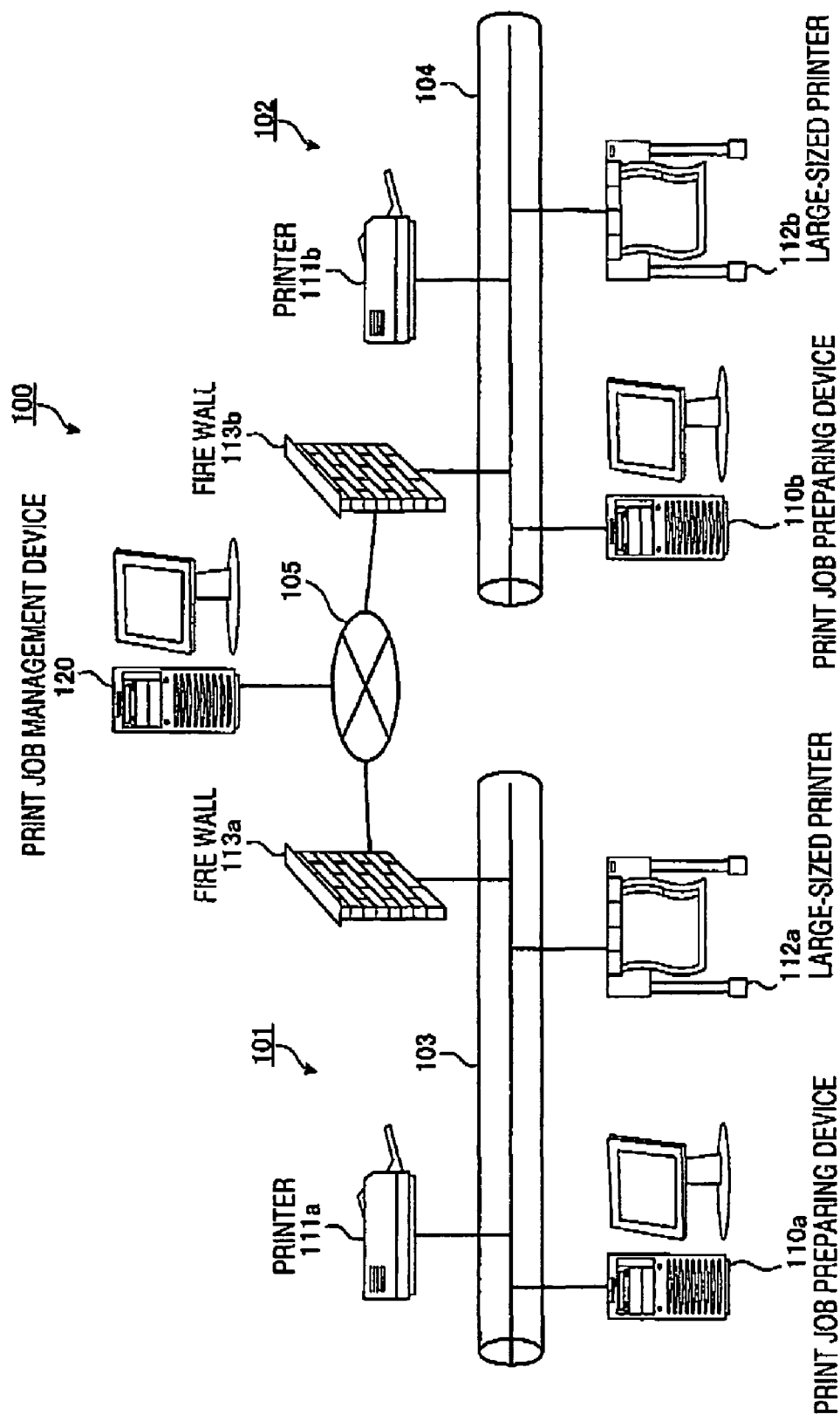
FIG. 1 is a diagram schematically illustrating a configuration of a large-scaled printing system.

FIG. 1 is a diagram illustrating a schematic configuration of a large-scaled printing system having a print job management device according to this embodiment. As shown in FIG. 1, a large-scaled printing system 100 has a structure in which printing systems 101 and 102 are connected to each other through a global network 105 such as Internet and a print job management device 120 is connected to the global network 105.

The printing systems 101 and 102 of the large-scaled printing system 100 include print job preparing devices 110a and 110b, respectively, which are used in shops such as photograph studios to prepare print jobs based on a variety of print services such as an enlarged print service, a poster print service, and a photo album print service.

The print job preparing devices 110a and 110b of the printing systems 101 and 102 are connected to printers 111a and 111b employing a laser printing method or an inkjet printing method and large-sized printers 112a and 112b performing a large-sized printing operation through local networks 103 and 104 such as a LAN having a smaller scale than that of the global network 105.

The respective print job preparing devices 110a and 110b are included in a general-purpose computer in which various programs or printer drivers such as a print information processing program and a print job preparing program and various data are installed and prepare print jobs based on a variety of print services described above when the print job preparing program is executed. The print jobs prepared by the print job preparing devices 110a and 110b are transmitted to the print job management device 120.

The respective printers 111a and 111b are capable of performing a color printing operation with high quality, for example, using printing papers with up to standard A4 size from a pickup tray and various printing papers with up to standard A3 size from a manual tray as a paper feed path (paper feed method). The respective large-sized printers 112a and 112b are capable of performing a color printing operation with high quality, for example, using printing papers larger than standard A1 size from a feed roller as a paper feed path (paper feed method).

The local networks 103 and 104 are connected to the global network 105 through, for example, fire walls 113a and 113b. Accordingly, the large-scaled printing system 100 has a structure in which the printing system 101 constructed in a shop and the printing system 102 constructed in another shop are connected through the global network 105 and the print job management device 120 manages the print jobs of the printing systems 101 and 102.

Here, when it is assumed that the printing system 101 serves as a photograph studio receiving a variety of print services and the printing system 102 serves as a print shop performing a printing operation accompanied with the print services, the print job management device 120 comprehensively manages the print jobs of the printing systems 101 and 102.

The print job management device 120 has a function as a print job management server for receiving print job files transmitted from the print job preparing devices 110a and 110b and transmitting an appropriate print job file to the print job preparing devices 110a and 110b or transmitting a file on a print instruction or an appropriate print job file to the printers 111a and 111b and the large-sized printers 112a and 112b.

(Functional Configuration of Large-Scaled Printing System Having Print Job Management Device)

Figure 2:
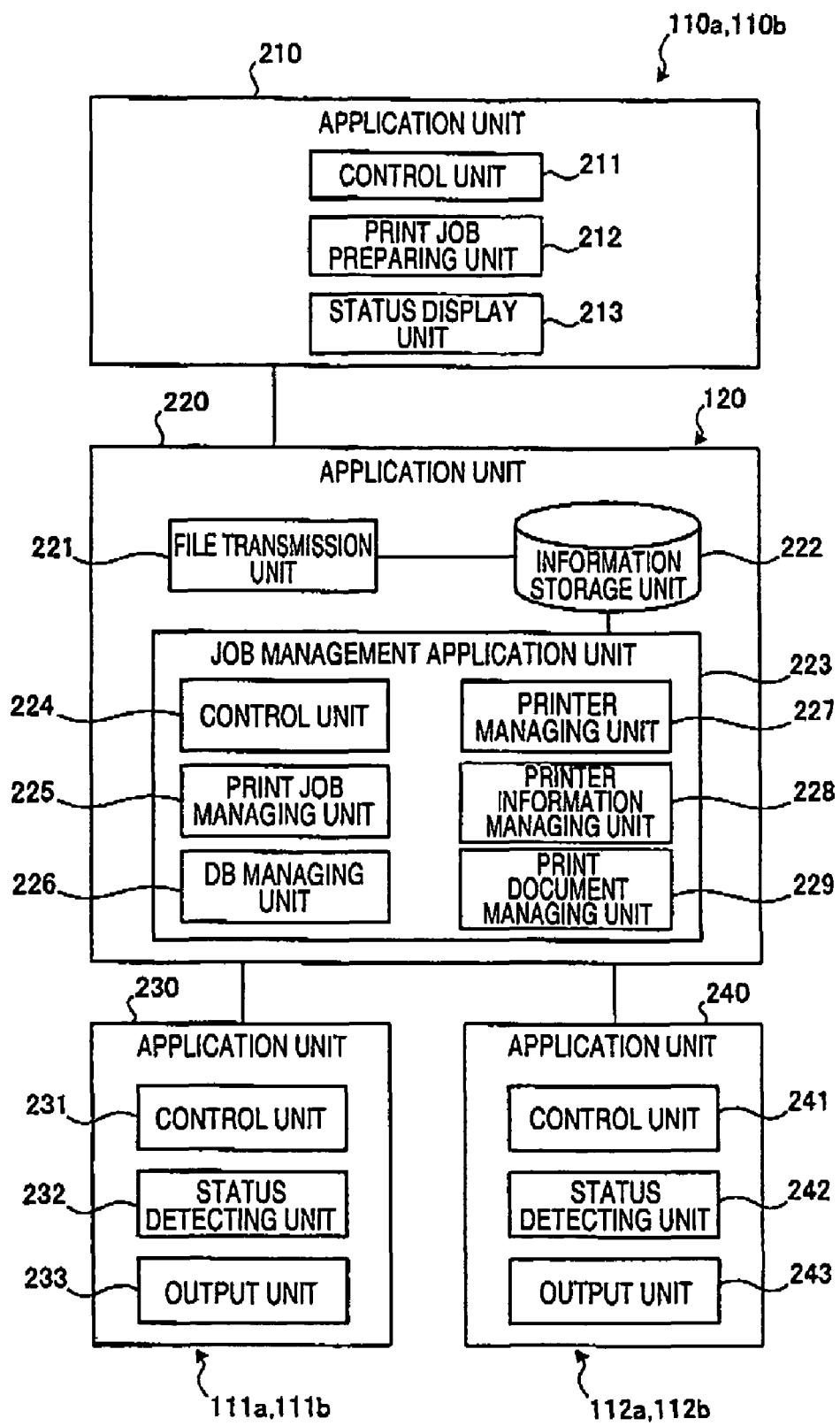
FIG. 2 is an explanatory diagram illustrating a functional configuration of the large-scaled printing system.

FIG. 2 is a diagram illustrating a functional configuration of a large-scaled printing system having a print job management device according to this embodiment. As shown in FIG. 2, the respective print job preparing devices 110a and 110b, the print job management device 120, the respective printers 111a and 111b, and the respective large-sized printers 112a and 112b of the large-scaled printing system 100 (see FIG. 1, which is true in the following description) have application units 210, 220, 230, and 240, respectively.

The application unit 210 of each print job preparing device 110a and 110b includes a control unit 211, a print job preparing unit 212, and a status display unit 213. The application unit 220 of the print job management device 120 includes a file transmission unit 221, an information storage unit 222, and a job management application unit 223. The application units 230 and 240 of the printers 111a and 111b and the large-sized printers 112a and 112b include control units 231 and 241, status detecting units 232 and 242, and output units 233 and 243, respectively.

The control units 211 of the application units 210 of the print job preparing devices 110a and 110b control the entire print job preparing devices 110a and 110b, respectively, and the print job preparing units 212 prepare a print job file based on a print service selected by a user. Print setting information on a setting of a printing operation is included in the print job file. The status display units 213 display status information of the print job management device 120, the printers 111a and 111b, and the large-sized printers 112a and 112b on the print job preparing devices 110a and 110b.

On the other hand, the file transmission unit 221 of the application unit 220 of the print job management device 120 serves as a file transmission server for transmitting a file such as a print job file prepared by the print job preparing units 212 of the print job preparing devices 110a and 110b and the information storage unit 222 serves as a database (hereinafter, referred to as "DB") for storing a variety of information to be processed by the print job management device 120. In this embodiment, it is assumed that the information storage unit 222 includes a DB of print jobs (hereinafter, referred to as "job DB") therein.

The job management application unit 223 of the application unit 220 carries out the whole management of a print job and includes a control unit 224, a print job managing unit 225, a DB managing unit 226, a printer managing unit 227, a printer information managing unit 228, and a print document managing unit 229.

The control unit 224 of the job management application unit 223 controls the entire processes based on the print job processed by the print job management device 120 and the print job managing unit 225 comprehensively manages the print job. The DB managing unit 226 manages the print jobs of the information storage unit 222. The printer managing unit 227 entirely manages the printers 111a and 111b and the large-sized printers 112a and 112b.

The printer information managing unit 228 manages the status information transmitted from the printers 111a and 111b and the large-sized printers 112a and 112b. The print document managing unit 229 performs a process of managing information on print documents to be printed in the print job to the printers 111a and 111b and the large-sized printers 112a and 112b.

The control units 231 and 241 of the application units 230 and 240 of the printers 111a and 111b and the large-sized printers 112a and 112b entirely control printers 111a and 111b and the large-sized printers 112a and 112b. The status detecting units 232 and 242 detect the statuses of the printers 111a and 111b and the large-sized printers 112a and 112b and transmit the detected status information to the printer information managing unit 228. The output units 233 and 243 output to display or output to print the information on the print documents which is transmitted from the print document managing unit 229 on the basis of the print job.

Print driver units or others of the print job preparing devices 110a and 110b, the print job management device 120, the printers 111a and 111b, and the large-sized printers 112a and 112b and thus description thereof will be omitted.

Hereinafter, the print job preparing devices 110a and 110b, the printers 111a and 111b, the large-sized printers 112a and 112b, and the fire walls 113a and 113b of the printing systems 101 and 102 have like configurations, respectively, and are generally described as the print job preparing device 110, the printer 111, the large-sized printer 112, and the fire wall 113, respectively, when not particularly described.

(Hardware Configuration of Print Job Managing Device)

Figure 3:
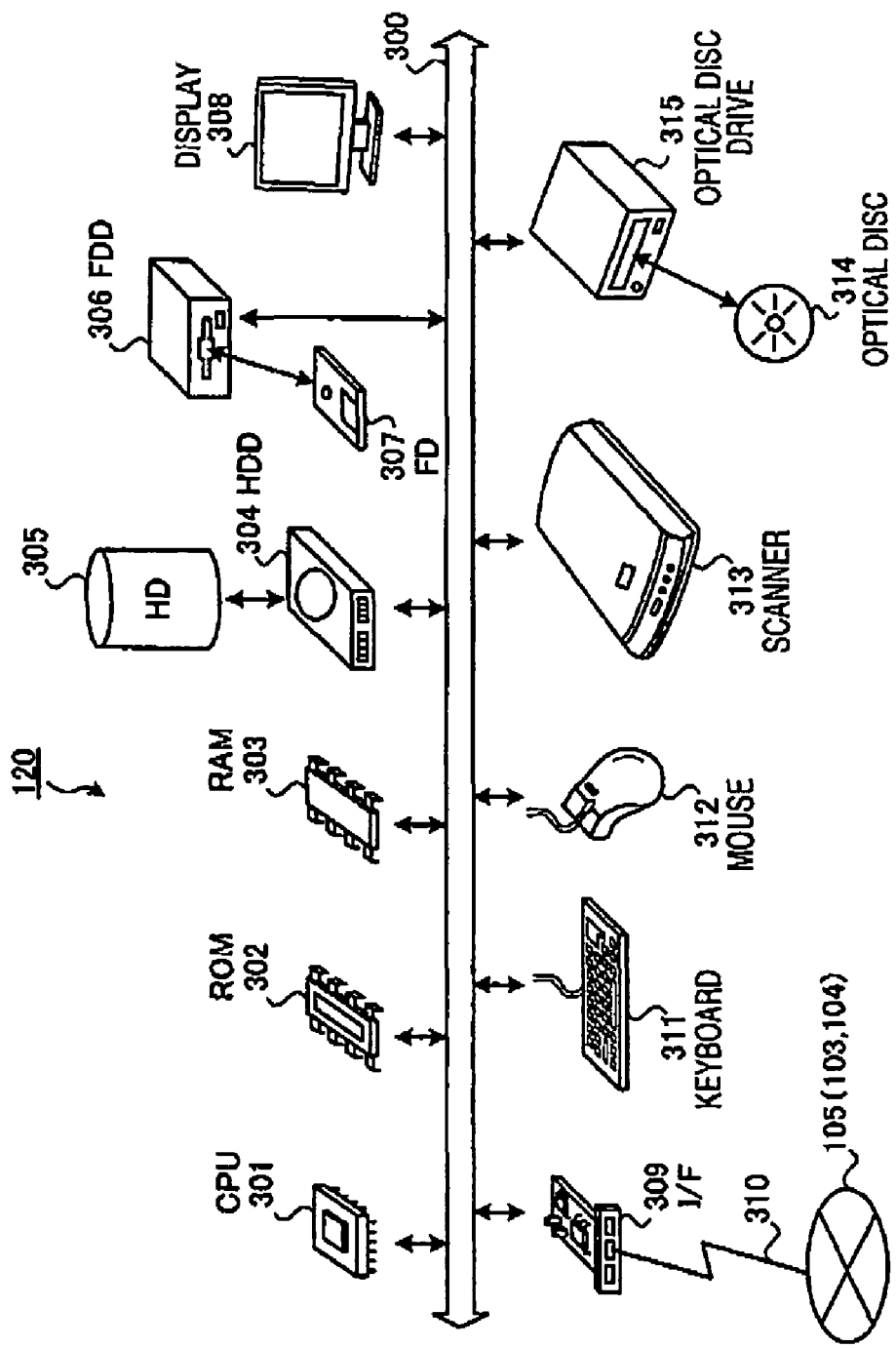
FIG. 3 is an explanatory diagram illustrating a hardware configuration of a print job management device.

FIG. 3 is an explanatory diagram illustrating a hardware configuration of the print job management device according to this embodiment. An example of the hardware configuration of the print job managing device 120 will be described here. However, since the same configuration can be applied to a variety of devices such as the print job preparing device 110, the printer 111, and the large-sized printer 112, the hardware configurations thereof will not be described. In the following description, the same elements as described above will be denoted by the same reference numerals and descriptions thereof will be omitted.

The print job management device 120 according to this embodiment includes a CPU 301, a ROM 302, a RAM 303, an HDD (Hard Disc Drive) 304, an HD (Hard Disc) 305, an FDD (Flexible Disc Drive) 306, an FD (Flexible Disc) 307, and a display 308.

The print job management device 120 includes an interface (I/F) 309, a keyboard 311, a mouse 312, a scanner 313, an optical disc 314, and an optical disc drive 315. The print job management device 120 stores and manages print job files transmitted through the file transmission unit 221 (see FIG. 2) from the print job preparing device 110 in the information storage unit 222 (see FIG. 2) and performs a management process of transmitting an appropriate print job file to the printer 111 and the large-sized printer 112 through the job management application unit 223. The above constituent elements 301 to 315 are connected to a bus 300.

The CPU (Central Processing Unit) 301 performs predetermined operating processes, controls the whole print job management device 120, and serves as the application unit 220 (see FIG. 2). The ROM (Read Only Memory) 302 stores a variety of processing programs and control programs. The programs may be stored in a storage device such as an HD 305 to be described later or a recording medium such as an optical disc 314, in addition to the ROM 302. Here, data stored in the Rom 302 can be rewritten by a user, but cannot be erased by means of the turning-off of a power supply.

The CPU 301 receives the print job files transmitted from the print job preparing device 110 through the I/F 309 to be described later, acquires the device status information transmitted from the printer 111 and the large-sized printer 112, and issues a print job to the printer 111 or the large-sized printer 112, which can perform a printing operation based on the print job, on the basis of the print job management program according to this embodiment.

When the printer 111 and the large-sized printer 112 cannot perform the printing operation based on the print job but the device status information indicates predetermined statuses regarding a paper feed path and a printing paper of the printer 111 and the large-sized printer 112, the CPU 301 issues a print job to the printer 111 and the large-sized printer 112.

The RAM (Random Access Memory) 303 stores variable data in a rewritable manner and serves as a work area of the CPU 301. The RAM 303 may be a volatile memory of which data are erased by means of the turning-off of a power supply or a nonvolatile memory which can be backed up by means of a battery.

The HDD 304 controls the reading/writing operations of information with respect to the HD 305 in accordance with a control command of the CPU 301. When the print job management program is recorded in, for example, an MO (Magneto-Optical disc) or a memory card, a specific drive unit which can read out the recorded information can be used instead of the HDD 304 or together with the HDD 304.

A variety of processing programs or control programs or a variety of information are recorded in the HD 305 in a manner that, for example, the CPU can read them. The HD 305 serves to accept the writing of information by the HDD 30 and to include the written information in a non-volatile manner. For example, the print job management program and a variety of information necessary for performing the print job management program are recorded in the HD 305. Accordingly, the information storage unit 222 of the application unit 220 shown in FIG. 2 includes the HD 305.

The recording of the print job management program is not limited to the HD 305. Instead of the HD 305, the print job management program may be recorded in the MO, the memory card, or the optical disc (DVD, CD, CD-ROM (CD-R, CD-RW)) 314 to be described later. For example, when the print job management program recorded in the optical disc 314 is used, the print job management program is read into the CPU 301 of the print job management device 120 by the optical disc drive 315 to be described later which can at least read the information recorded in the optical disc 314.

A print driver for controlling the driving of the printer 111 or the large-sized printer 112 may be stored in the HD 305. Here, the print driver performs a process of activating the printer 111 and the large-sized printer 112 through a network cable 310, the global network 105, and the local networks 103 and 104 and plays a role in relaying the print job management device 120 to the printer 111 and the large-sized printer 112. The print driver may include, for example, a firmware or may include an ASIC (Application Specific Integrated Circuit).

The FDD 306 controls the reading/writing operation of information with respect to the FD 307 in accordance with a control command from the CPU 301. The FD 307 is a detachable recording medium which accepts the writing of information by the FDD 306 and includes the written information in a non-volatile manner.

The display 308 includes a display device such as a CRT (Cathode Ray Tube), a TFT (Thin Film Transistor) liquid crystal display, an organic EL (ElectroLuminescence) display, and a plasma display. Specifically, the display 308 includes an image I/F (not shown) or an image displaying device (not shown) connected to the image I/F.

A variety of information such as icons, cursor, menu, window, and characters or images is displayed on the display 308. Specifically, status information or environment setting information of the printer 111 and the large-sized printer 112 and an operation explaining picture associated with the start of a manual printing operation (hereinafter, referred to as "manual print starting operation explaining picture"), which are managed by the print job management device 120, are displayed on the display 308.

The I/F 309 is connected to the global network 105 and the local networks 103 and 104, for example, through a network cable 310 and is formed of a network board serving as an interface between the networks 103 to 105 and the CPU 301. The I/F 309 receives and transmits a variety of information from and to the print job preparing device 110, another print job management device 120, or other devices through the networks 103 to 105. The I/F 309 may include a slot unit for a memory card or a communication module for performing a radio communication.

Here, the transmission and reception of a variety of information in the I/F 309 may be performed regardless of wired or wireless communication. Specifically, in the print job management device 120 according to this embodiment, the I/F 309 receives print job files from the print job preparing device 110 connected thereto through the networks 103 to 105 in accordance with the control command from the CPU 301 and transmits the received print job files to the printer 111 and the large-sized printer 112. Accordingly, the I/F 309 is provided for receiving the print job and for acquiring the device status information.

Here, in a case that the I/F 309 is a communication module for performing a radio communication, wired lines such as the network cable 310 as a communication medium is not necessary and the transmission and reception of a variety of information is performed using electrical waves, infrared rays, or ultrasonic waves. Examples of standards for the wireless communication can include a variety of techniques such as LAN (Local Area Network), IrDA (Infrared Data Association), HomeRF (Home Radio Frequency), and BlueTooth, but a variety of known wireless communication techniques can be used in this embodiment.

The keyboard 311 includes a plurality of keys for inputting a variety of instructions such as characters and numerals and outputs information input by a user (hereinafter, referred to as "input information") to the CPU 301. The mouse 312 is a device for selecting a variety of instructions, selecting a process target, and moving a cursor and outputs the information input by a user to the CPU 301, similarly to the keyboard 311.

In order to output the information input by a user to the CPU 301 similarly to the keyboard 311 and the mouse 312, a variety of known devices such as a push button switch for detecting the physical pressing/non-pressing, a touch panel, a joystick, and a track ball may be employed. The information input by means of voice recognition may be output to the CPU 301 by the use of a microphone for inputting external voice.

Here, in a case that the touch panel is used to output the information input by the user to the CPU 301, the touch panel may be stacked on the side of a display screen of the display 308 for use. In this case, the input information can be recognized by managing the display time of the information on the display 308, the operation time of the touch panel, and the positional coordinates thereof. In this way, by employing the touch panel, it is possible to decrease the entire size of the print job management device 120 and to perform various information input operations. Examples of the touch panel includes a variety of known touch panels such as a resistive touch display and a compressing touch panel.

The scanner 313 is a device for optically reading characters, figures, and images from a document such as paper and inputting the information as image data and includes a flat head scanner or a handy scanner having a sensor such as a CCD (Charge Coupled Device) sensor or a CMOS (Complementary Metal Oxide Semiconductor) sensor.

The optical disc 314 is a portable recording medium which can be mounted on or demounted from the optical disc drive 315. The optical disc 314 stores a variety of information such as image data like photographs or print job programs. The optical disc drive 315 reads/writes information from/to the optical disc 314 in accordance with the CPU 301.

Here, when the optical disc 314 is, for example, a CD-ROM (CD-R and CD-RW), the optical disc drive 315 is, for example, a CD-ROM drive. Since the CD-ROM drive is widely known, the illustration and description thereof will be omitted. When a recording medium replacing the optical disc 314 is employed, the optical disc drive 315 may include a drive unit which can read data from the employed recording medium.

Next, a process of preparing a print job in the print job preparing unit 212 of the application unit 210 of the print job preparing device 110 employing the same hardware configuration as the hardware configuration of the print job management device 120 will be described in brief.

(Print Job Preparing Process of Print Job Preparing Device)

Figure 4:
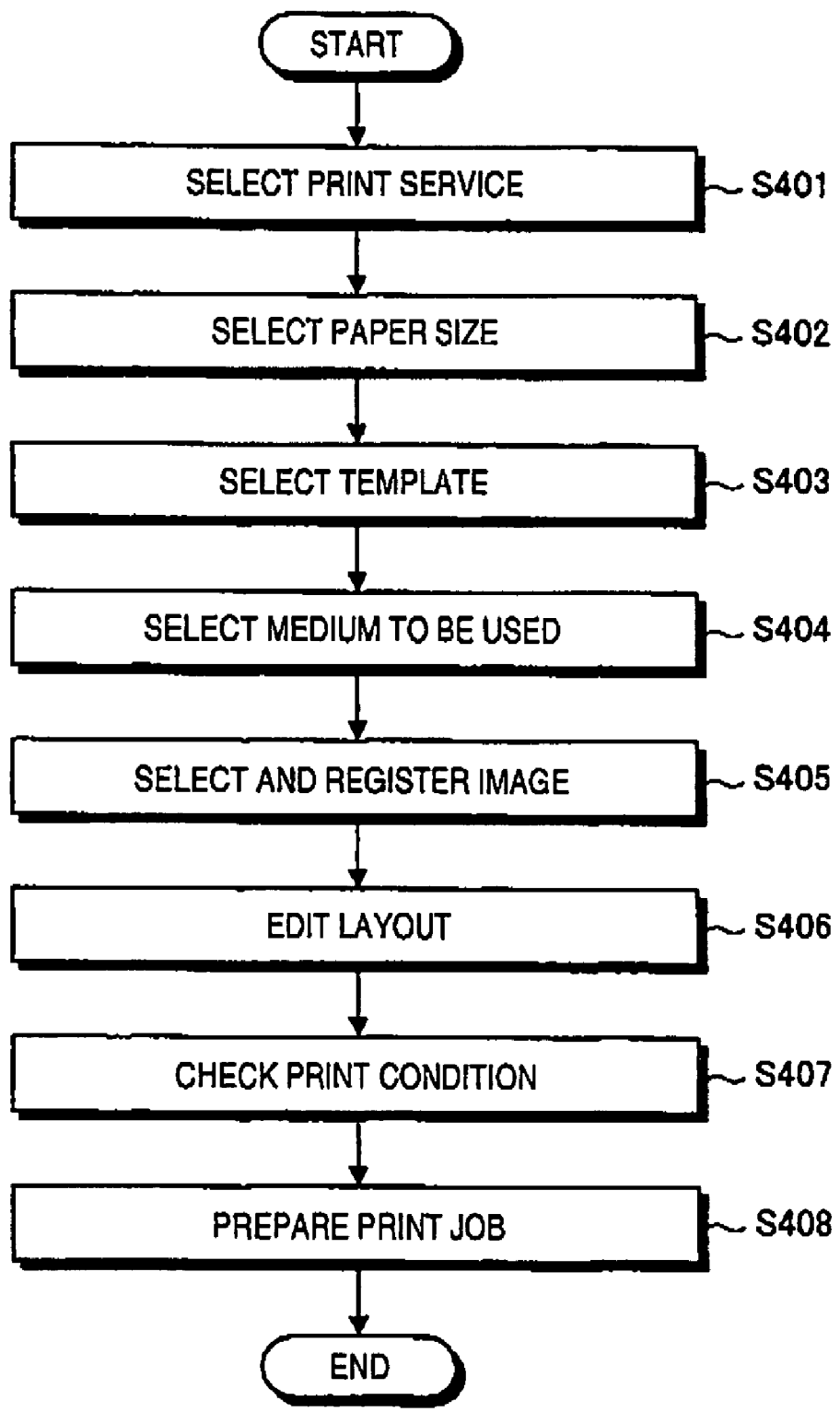
FIG. 4 is a flowchart illustrating an example of a print job preparing process.

FIG. 4 is a flowchart illustrating an example of a print job preparing process of the print job preparing device in the large-scaled printing system having the print job management device according to this embodiment. Specifically, the process shown in FIG. 4 is a process performed by the print job preparing unit 212 of the application unit 210 shown in FIG. 2 and is performed by allowing the CPU 301 to execute the print job preparing program stored (written) in the ROM 302, the RAM 303, the HD 305, or the optical disc 314 shown in FIG. 3. Here, the print job preparing device 110 having a structure in which the touch panel is stacked on the display screen of the display 308 is employed (see FIG. 3), and an appropriate item selecting picture is displayed on the display screen.

In the flowchart shown in FIG. 4, first, the CPU 301 selects a desired print service from a plurality of print services displayed on the display screen of the display 308 on the basis of the information input by a user (step S401). Next, the CPU 301 selects a desired paper size from a plurality of paper sizes displayed on the display screen on the basis of the input information (step S402).

Then, a desired template is selected from a plurality of templates displayed on the display screen on the basis of the input information (step S403) and a medium to be used is selected from a plurality of mediums displayed on the display screen on the basis of the input information (step S404).

After selecting the medium, a desired image is selected and registered from a plurality of images in the used medium displayed on the display screen on the basis of the input information (step S405). A layout edition is performed to a layout of images in the template displayed on the display screen on the basis of the input information (step S406).

Then, a printing condition is determined on the basis of the input information to specify a variety of print setting information such as the number of printed medium and print quality of the printing operation to be actually performed by the printer 111 or the large-sized printer 112 (step S407) and a print job including the print setting information based on the determined printing condition is prepared (step S408). In this way, a series of print job preparing process in the flowchart is finished.

Next, a print job managing process of the application unit 220 and the job management application unit 223 of the print job management device 120 having received the prepared print job file and a printer information managing process and a print document managing process accompanied with the print job managing process will be described. The printer information managing process includes a job status changing process and the processes are concurrently performed by the print job management device 120.

Accordingly, the process to be performed later is a process performed by the application unit 220 and the job management application unit 223 of the print job management device 120 shown in FIG. 2 and is performed by allowing the CPU 301 to execute the print job management program stored (recorded) in the RMO 302, the RAM 303, the HD 305, or the optical disc 314 of the print job management device 120 shown in FIG. 3. The print job files received and transmitted through the networks 103 to 105 are briefly described as a print job in the following description. The printer 111 will be mainly explained in the following description, but the same process may be performed to the large-sized printer 112.

(Print Job Managing Process of Print Job Management Device)

Figure 5:
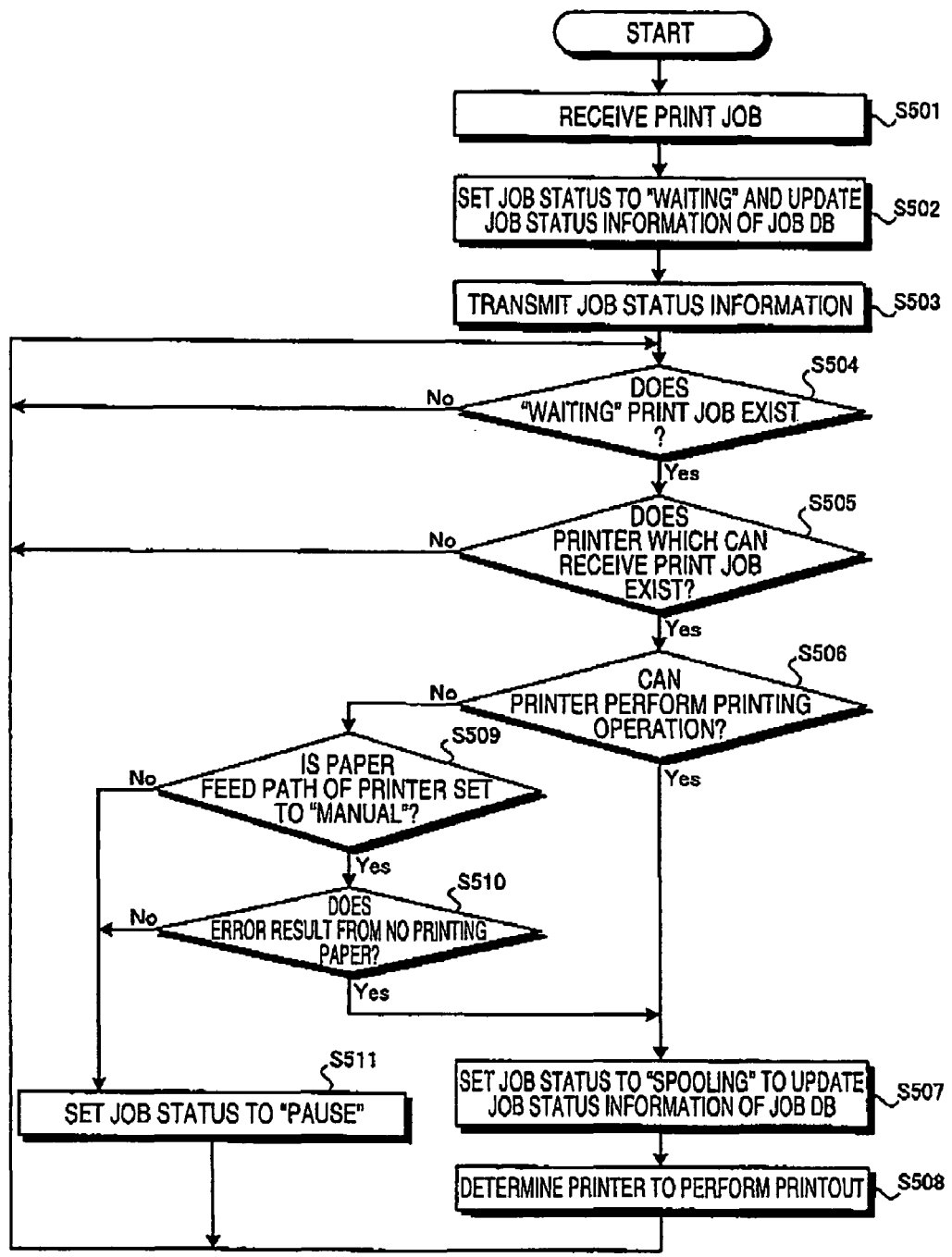
FIG. 5 is a flowchart illustrating an example of a print job managing process.

FIG. 5 is a flowchart illustrating an example of the print job managing process of the print job management device according to this embodiment. In the flowchart shown in FIG. 5, first, the print job transmitted from the print job preparing device 110 through the file transmission unit 221 is received by the job management application unit 223 (step S501). The job status in a status display picture to be described later on the display screen of the display 308 is set to "waiting" by the print job managing unit 225 and the DB managing unit 226, and the job status information of the job DB is updated (step S502).

Next, the job status information is transmitted through the DB managing unit 226 and the file transmission unit 221 (step 5503) so as to allow the print job managing unit 225 to display the updated job status information on the status display unit 213 of the print job preparing device 110 and it is determined with reference to a plurality of job status information existing in the job DB whether a print job in "waiting" exists (step S504).

It waits until the print job managing unit 225 determines that a print job in "waiting" exists (step S504: No). When it is determined that the print job in "waiting" exists (step S504: Yes), the printer managing unit 227 is allowed to search for a printer, which is turned on and can start a rendering operation, on the basis of the device status information of the printers 111 from the printer information managing unit 228, thereby determining whether a printer 111 which can accept the print job as the printer exists (step S505). The process subsequent to the process of step S505 is repeatedly performed by the number of searched printers 111 which can accept the print job.

When it is determined that no printer 111 which can accept the print job exists (step S505: No), the process of step S504 is performed again. When it is determined that a printer 111 which can accept the print job exists (step S505: Yes), the printer information managing unit 228 is allowed to determine whether the printer 111 is in a print able status (step S506). Here, the printable status indicates a status in which the setting and the device status regarding the paper feed path and the printing paper correspond to the print setting information and the device status information.

When it is determined that the printer is in a printable status (step S506; Yes), the print job managing unit 225 and the DB managing unit 226 set the job status on the status display picture of the display screen of the display 308 to "spooling" to update the job status information of the job DB (step S507) and determines the printer 111 to perform the printing operation (step S508). Then, the process of step S504 is performed again.

On the other hand, when it is judged that the printer is not in a printable status (step S506: No), the printer information managing unit 228 determines whether the paper feed path of the printer 111 is set to "manual" (step S509). When it is determined that the printer 111 is set to "manual" (step S509: Yes), it is determined whether an error results from no printing paper (step S510). When it is determined that the error results from no printing paper (step S510: Yes), the process of step S507 is performed.

When it is determined in step S509 that the printer is not set to "manual" (step S509: No) and it is determined in step S510 that the error does not result from no printing paper (step S510: No), the print job managing unit 225 and the DB managing unit 226 set the job status in the status display picture on the display screen of the display 308 to "pause" (step S511) and the process of step S504 is performed again. Next, a printer information managing process will be described.

(Printer Information Managing Process of Print Job Management Device)

Figure 6:
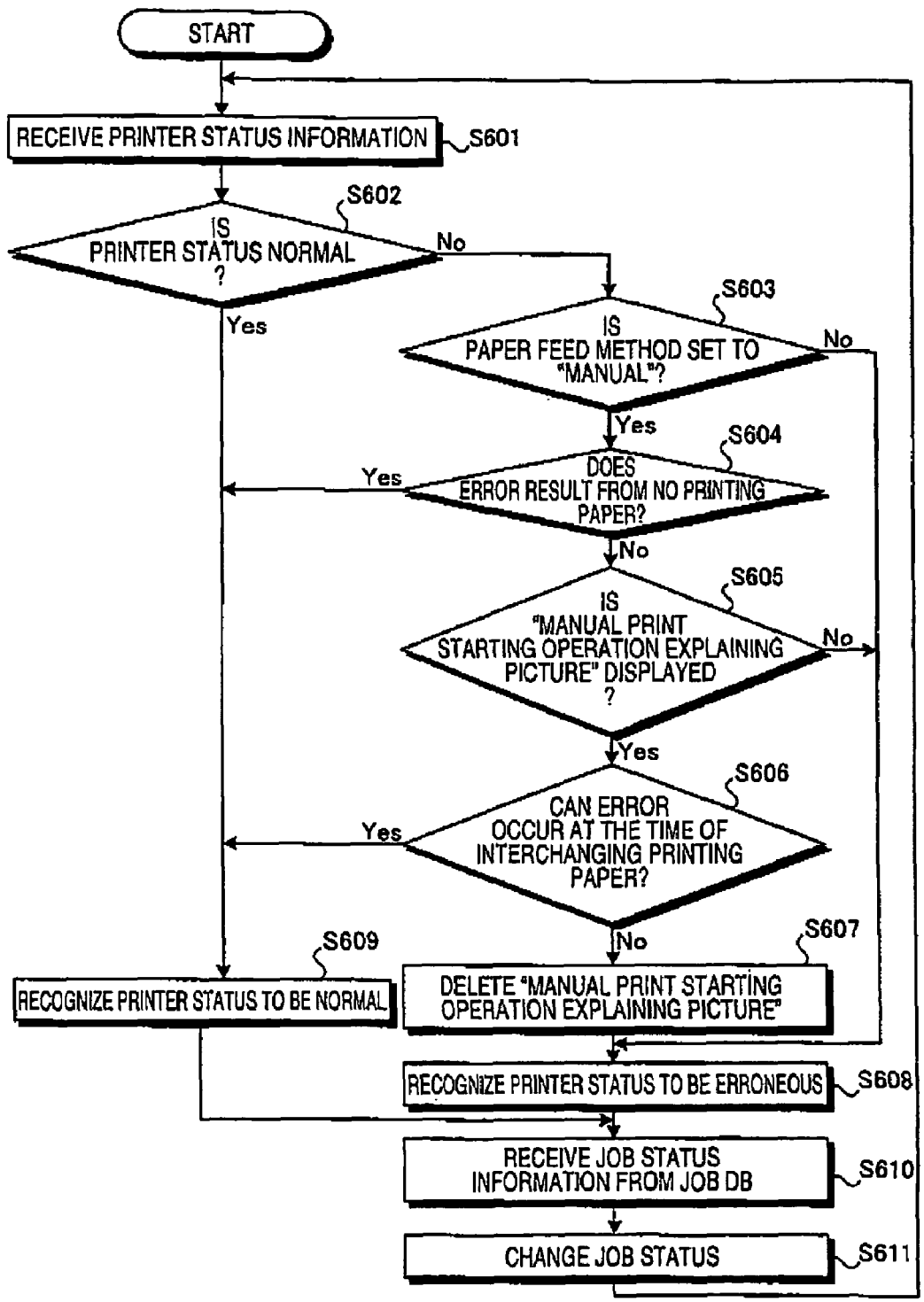
FIG. 6 is a flowchart illustrating an example of a printer information managing process.

FIG. 6 is a flowchart illustrating an example of a printer information managing process of the print job management device according to this embodiment. In the flowchart shown in FIG. 6, first, the printer information managing unit 228 receives the printer status information indicating the status of the printer 111 and transmitted from a status detecting unit 231 of the printer 111 (step S601) and determines whether the printer 111 is in a normal status (step S602).

When it is determined that the printer 111 is not in the normal status (step S602: No), it is determined whether the paper feed method of the printer 111 is set to "manual" (step S603). When it is determined that the paper feed method is set to "manual" (step S603: Yes), it is determined whether the error results from no printing paper (step S604). When it is determined that the error does not result from no printing paper (step S604: No), it is determined by the print job managing unit 225 whether "manual print starting operation explaining picture" is being displayed in the status display picture on the display screen of the display 308 (step S605).

When it is determined that "manual print starting operation explaining picture" is being displayed (step S605: Yes), it is determined by the print job managing unit 225 whether the error is an error which can occur at the time of interchanging a printing paper (step S606). Here, the error which can occur at the time of interchanging a printing paper means an error resulting from, for example, the opening of a printing paper pressing mechanism or the insertion failure of a printing paper.

When it is determined that the error is not an error which can occur at the time of interchanging a printing paper (step S606: No), the "manual print starting operation explaining picture" displayed in the status display picture on the display screen of the display 308 is deleted by the print job managing unit 225 (step S607) and the status of the printer 111 is recognized as an error by the printer managing unit 227 (step S608). The print job managing unit 225 receives the job status information from the job DB through the DB managing unit 226 (step S610) and changes the job status (step S611). Then, the process of step S601 is performed again.

On the other hand, when it is determined in step S602 that the printer is in the normal status (step S602: Yes), when it is determined in step S604 that the error results from no printing paper (step S604: Yes), and when it is determined in step S606 that the error is an error which can occur at the time of interchanging a printing paper (step S606: Yes), the printer managing unit 227 recognizes the status of the printer 111 as a normal status (step S609). Then, the process of step S610 is performed.

When it is determined in step S603 that the paper feed method is not set to "manual" (step S603: No) and when it is determined in step S605 that the "manual print starting operation explaining picture" is not being displayed (step S605; No), the process of step S608 is performed. Next, a print document managing process will be described.

(Print Document Managing Process of Print Job Management Device)

Figure 7:
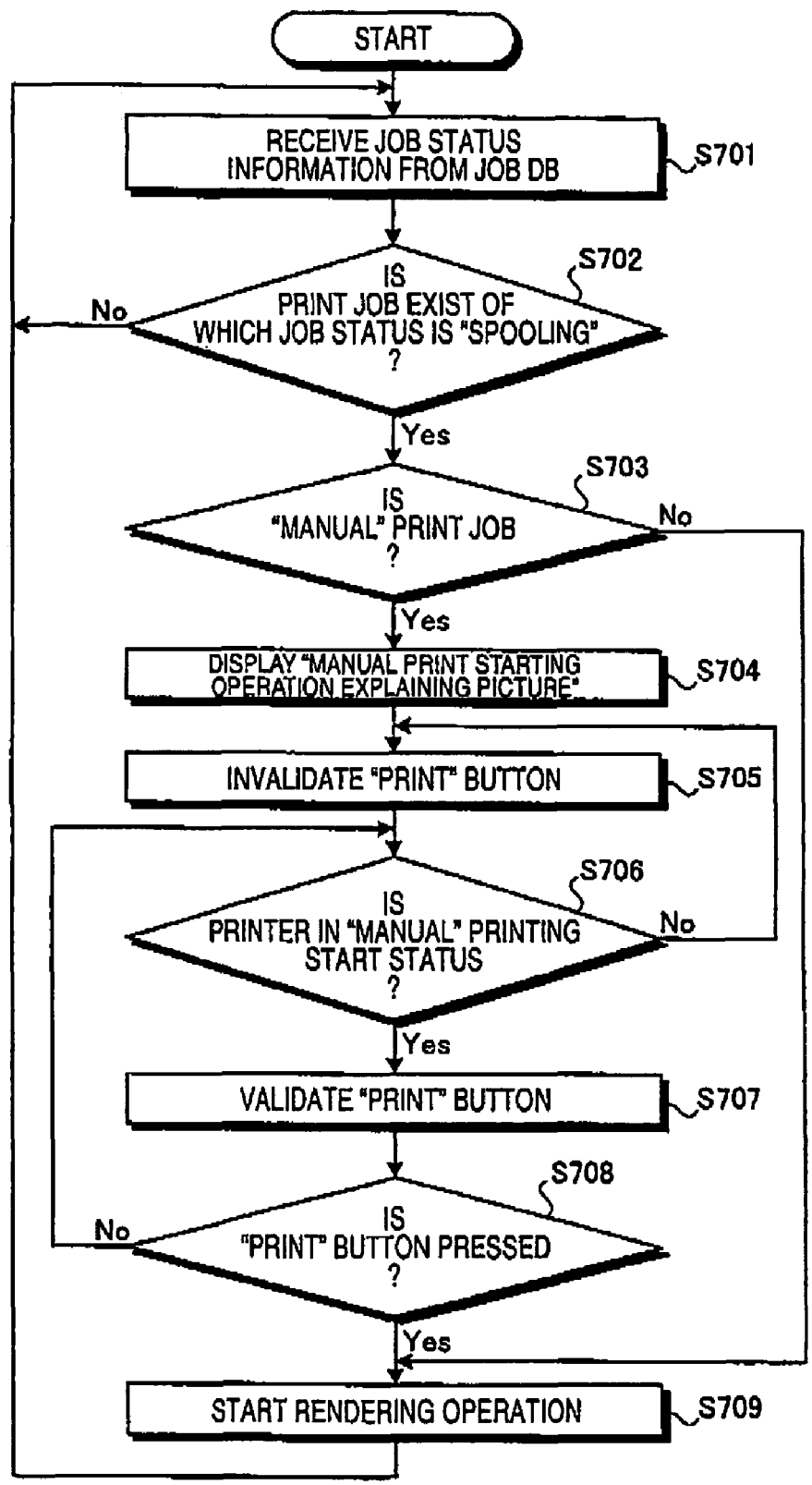
FIG. 7 is a flowchart illustrating an example of a print document managing process.

FIG. 7 is a flowchart illustrating an example of a print document managing process of the print job management device according to this embodiment. In the flowchart shown in FIG. 7, first, the print job managing unit 225 receives the job status information from the job DB through the DB managing unit 226 (step S701) and determines whether a print job having the job status in "spooling" exists (step S702).

When it is determined that the print job in "spooling" does not exist (step S702: No), the process of step 5701 is performed again. When it is determined that the print job in "spooling" exists (step S702: Yes), the print job managing unit 225 determines whether the print job is a "manual" print job (step S703). When it is determined that the print job is not a "manual" print job (step S703: No), the print document managing unit 229 starts the rendering operation to the print job at once (step S709) and the process of step S701 is performed again.

When it is determined that the print job is a "manual" print job (step S703: Yes), the print job managing unit 225 displays the "manual print starting operation explaining picture" in the status display picture on the display screen of the display 308 (step S704) and invalidates the "print" button in the "manual print starting operation explaining picture" (step S705).

Then, the printer information managing unit 228 determines whether the printer 111 is in a "manual" printable status (step S706). When it is determined that the printer is not in the "manual" printable status (step S706: No), the process of step S705 is performed again. On the other hand, when it is determined that the printer is in the manual printable status (step S706: Yes), the print job managing unit 225 validates the "printing" button in the "manual print starting operation explaining picture" (step S707) and the control unit 224 determines whether the "print" button is pressed on the basis of the input information received from the mouse 312 or the like (step S708).

When it is determined that the "print" button is pressed (step S708: Yes), the rendering operation is started in step 5709 (step S709). On the other hand, when it is determined that the "print" button is not pressed (step S708: No), the process of step 5706 is performed again. Next, a job status changing process performed in step S611 of the printer information managing process in the flowchart shown in FIG. 6 will be described.

(Job Status Changing Process in Printer Information Managing Process of Print Job Management Device)

Figure 8:
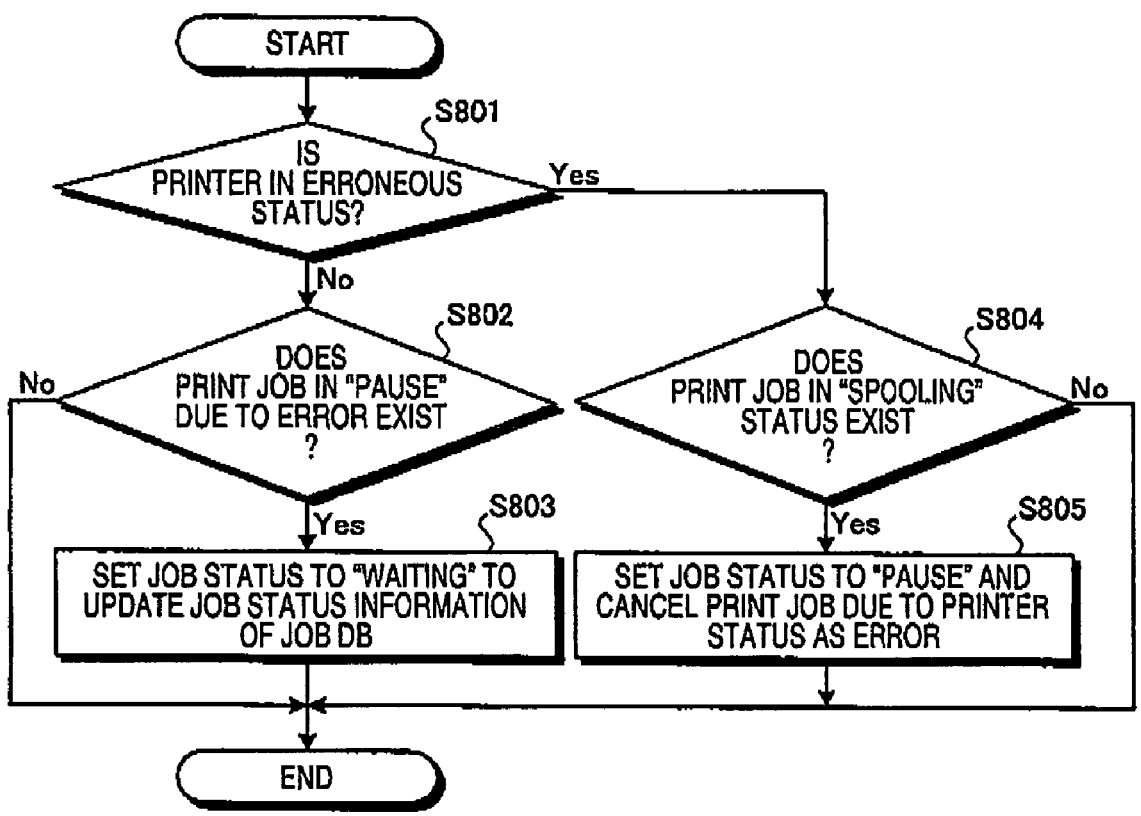
FIG. 8 is a flowchart illustrating an example of a job status changing process.

FIG. 8 is a flowchart illustrating an example of a job status changing process in the printer information managing process of the print job management device according to this embodiment. The process is on the condition that the print job managing unit 225 receives the job status information from the job DB through the DB managing unit 226 and the printer information managing unit 228 receives the printer status information from the status detecting unit 232 of the printer 111.

In the flowchart shown in FIG. 8, first, the printer information managing unit 228 determines whether the printer 111 is in an erroneous status (step S801). When it is determined that the printer is not in the erroneous status (step S801: No), the print job managing unit 225 determines whether a print job in "pause" resulting from an error exists through the DB managing unit 226 (step S802).

When it is determined that a print job in "pause" exists (step S802: Yes), the print job managing unit 225 and the DB managing unit 226 set the job status in the status display picture on the display screen of the display 308 to "waiting" to update the job status information of the job DB (step S803) and a series of job status changing process in the flowchart is finished.

On the other hand, when it is determined in step S801 that the printer is in the erroneous status (step S801: Yes), the print job managing unit 225 determines whether a print job in "spooling" exists (step S804).

When it is determined that a print job in "spooling" exists (step S804: Yes), the print job managing unit 225 and the printer information managing unit 228 set the job status in the status display picture on the display screen of the display 308 to "pause" and cancels the print job by recognizing the printer 111 as being in the erroneous status (step S805). Then, a series of job status changing process in the flowchart is finished.

In this way, by allowing the print job management device 120 to concurrently perform the above-mentioned processes, it is possible to perform a spooling (issuing) operation without canceling a print job, when the printer 111 is not in a printable status but a predetermined status associated with the manual printing is set. Accordingly, it is possible to reduce a user's burden by efficiently processing or managing the print job. Next, the status display picture displayed on the display screen of the display 308 of the print job management device 120 will be described in brief.

(Status Display Picture of Print Job Management Device)

Figure 9:
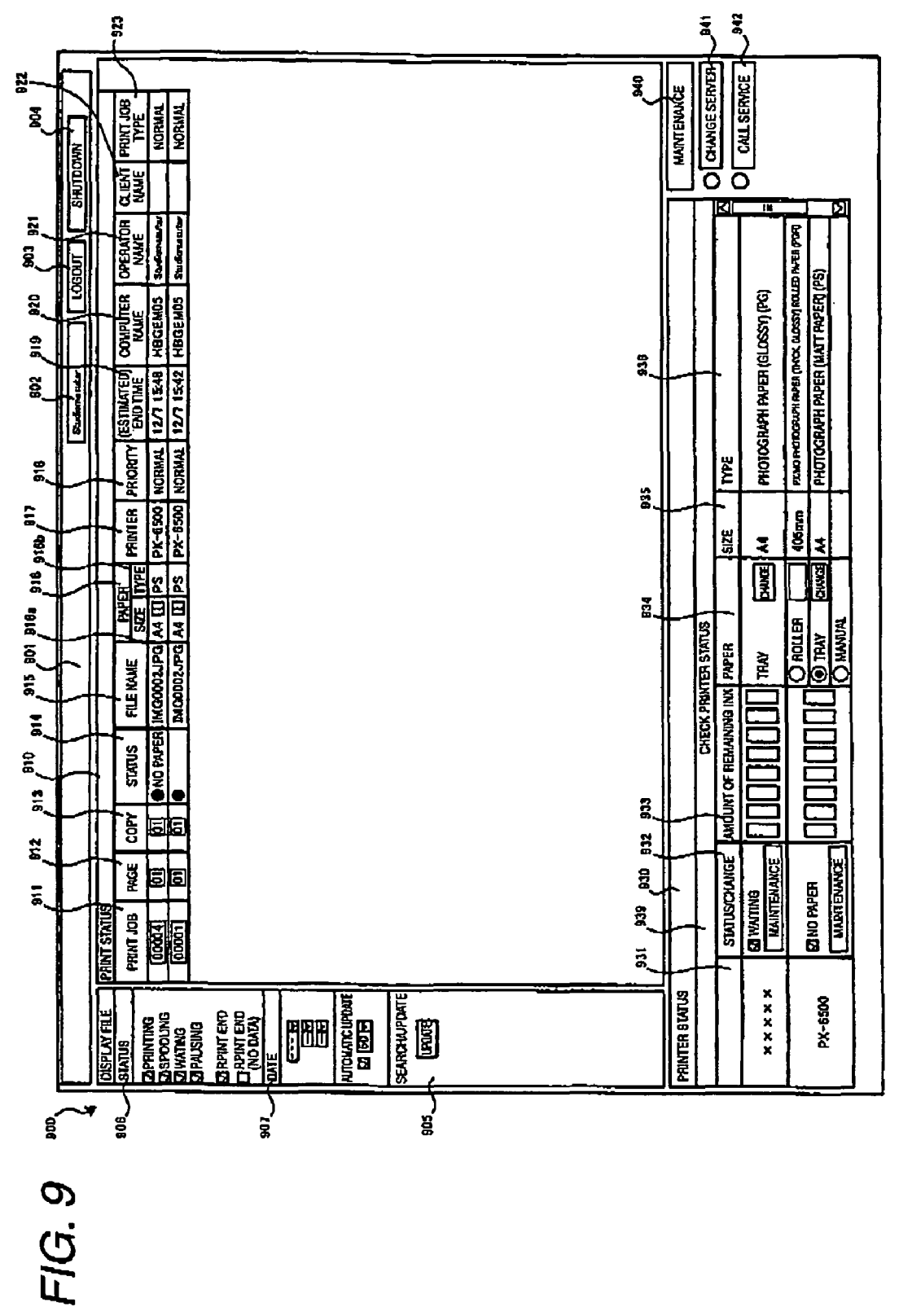
Figure 10:
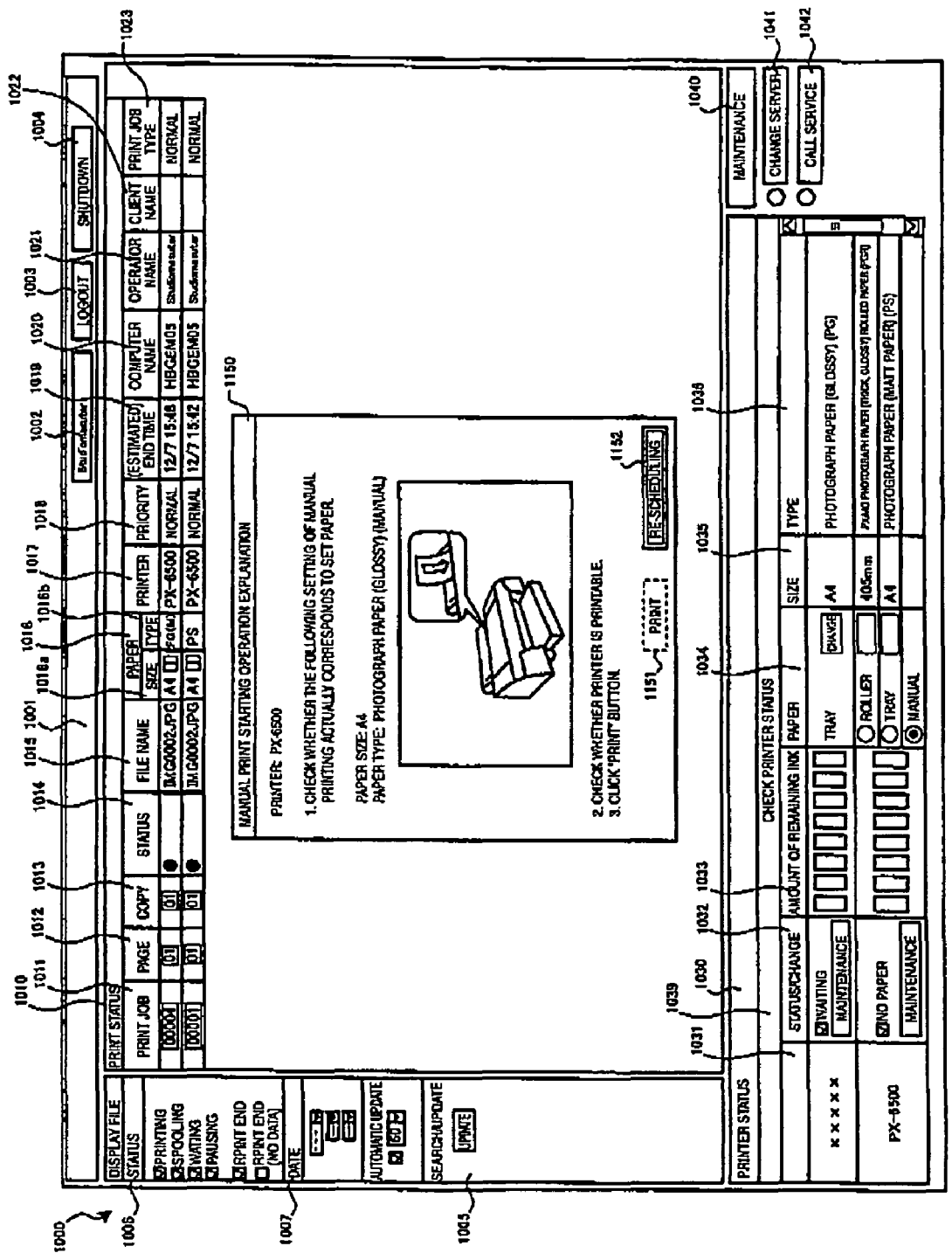
FIG. 10 is a flowchart illustrating an example of a status display picture in the print job management device.
Figure 11:
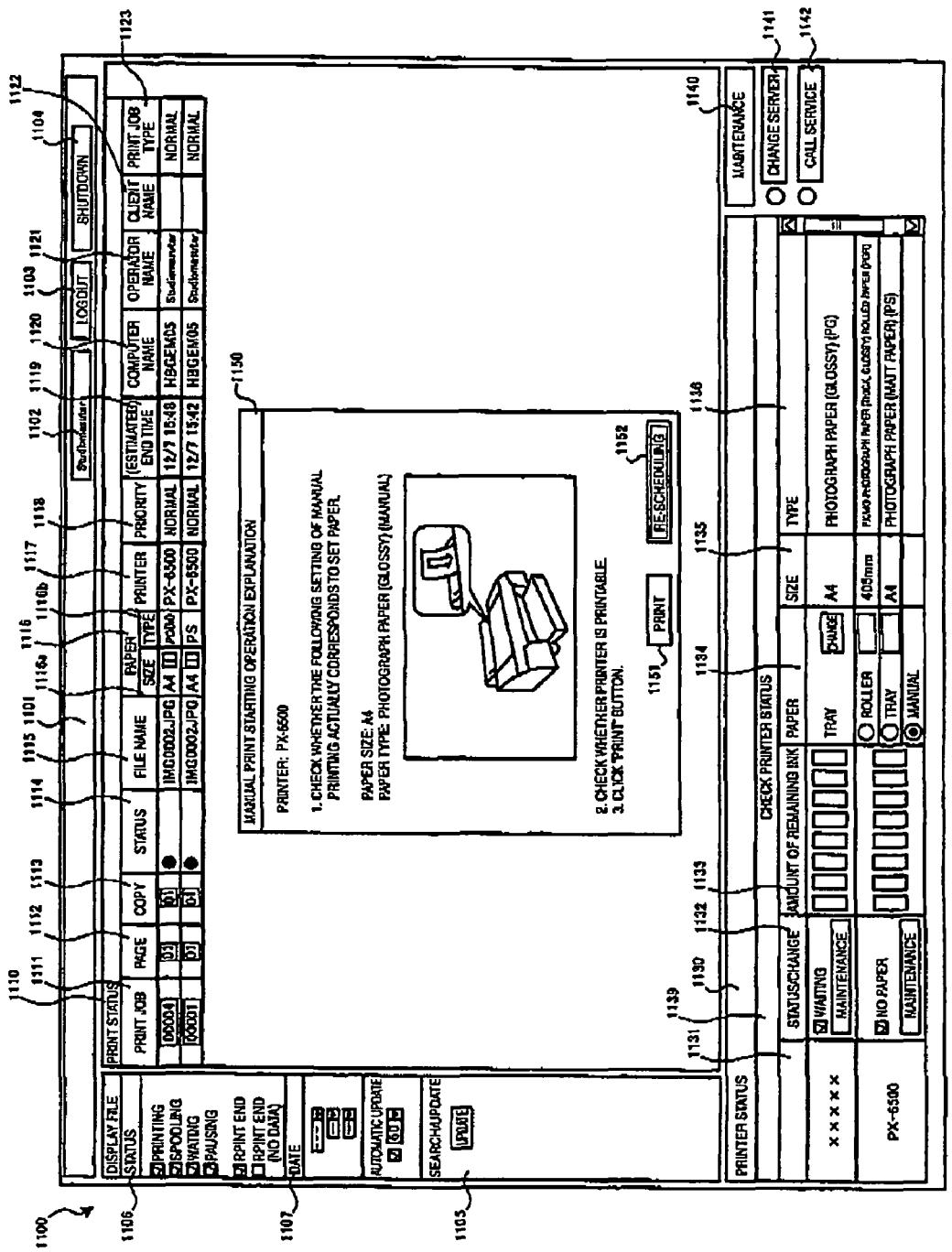
FIG. 11 is a flowchart illustrating an example of a status display picture in the print job management device.

FIGS. 9 to 11 are diagrams illustrating examples of the status display picture in the print job management device according to this embodiment. As shown in FIGS. 9 to 11, status display pictures 900, 1000, and 1100 displayed on the display screen of the display 308 of the print job management device 120 include status bars 901, 1001, and 1101 for displaying items associated with a user of the print job management device 120, print status display columns 910, 1010, and 1110 for displaying items associated with a print status, printer status display columns 930, 1030, and 1130 for displaying items associated with a printer status, and maintenance display columns 940, 1040, and 1140 for displaying items associated with maintenance, respectively.

Login name display items 902, 1002, and 1102 for displaying a login user, logout buttons 903, 1003, and 1103, and shutdown buttons 904, 1004, and 1104 for shutdown are displayed in the status bars 901, 1001, and 1101, respectively. Print job items 911, 1011, and 1111 for displaying a print job number, page items 912, 1012, and 1112 for displaying the number of pages, copy items 913, 1013, and 1113 for displaying the number of copies, status items 914, 1014, and 1114 for displaying a status, file name items 915, 1015, and 1115 for displaying a file name, paper items 916, 1016, and 1116 for displaying paper size items 916a, 1016a, and 1116a and paper type items 916b, 1016b, and 1116b associated with a paper are displayed in the print status display columns 910, 1010, and 1110, respectively.

Printer items 917, 1017, and 1117 for displaying a printer 111 performing a print job, priority items 918, 1018, and 1118 for displaying a priority of a print job, end time items 919, 1019, and 1119 for displaying end time of a printing operation based on the print job, computer name items 920, 1020, and 1120 for displaying a computer name to be used, operator name items 921, 1021, and 1121 for displaying an operator name performing the printing operation based on the print job, client name items 922, 1022, and 1122 for displaying a client name for the printing operation, and print job type items 923, 1023, and 1123 for displaying a type of a print job are displayed in the print status display columns 910, 1010, and 1110, respectively.

Printer items 931, 1031, and 1131 for displaying a printer 111 of which the status is displayed, status changing items 932, 1032, and 1132, ink remaining amount items 933, 1033, and 1133, paper items 934, 1034, and 1134, and paper size items 935, 1035, and 1135, and paper type items 936, 1036, and 1136 are displayed in the printer status columns 930, 1030, and 1130, respectively. Server changing buttons 941, 1041, and 1141 and service call buttons 942, 1042, and 1142 are displayed in the maintenance display columns 940, 1040, and 1140, respectively.

The status display pictures 900, 1000, and 1100 include update display columns 905, 1005, and 1105, job status display columns 906, 1006, and 1106, and date display columns 907, 1007, and 1107, respectively. As shown in FIGS. 10 and 11, when the "manual print starting operation explaining picture" is displayed in step S704 in the flowchart shown in FIG. 7, the manual print starting operation explaining picture 1150 is displayed in the status display picture 900, 1000, and 1100.

An explanation text for explaining a variety of operation procedures associated with the manual printing operation such as a method of setting a printing paper associated with the manual printing operation, a print button 1151 for instructing a manual print starting operation, and a re-scheduling button 1152 for re-scheduling the manual printing operation are displayed in the manual print starting operation explaining picture 1150.

For example, as shown in FIG. 10, if the manual print starting operation explaining picture 1150 is first displayed in the status display picture 1000, it is in a non-printable status (error) for the paper feed path or the printing paper even when the print job management device 120 has already issued a print job to the printer 111. Accordingly, the print button 1151 is invalidated so as not to be selected or pressed by the process of step S705.

However, as shown in FIG. 11, when the printer 111 is changed to the printable status for the paper feed path or the printing paper by the print job management device 120, the print button 1151 is validated so as to be selected or pressed by the process of step S707. The print document rendering operation is started in the printer 111 by selecting or pressing the validated print button 1151.

In the meantime, since the print job management device 120 has already issued a print job to the printer 111, it is possible to efficiently and properly manage a print job by issuing another print job. Accordingly, it is possible to omit a process of re-issuing a print job associated with the manual printing operation, thereby reducing the user's burden greatly.

The print job management method described in the above-mentioned embodiments can be embodied, for example, by allowing a computer mounted on the print job management device to execute a predetermined program. The program is recorded in a computer-readable recording medium such as a hard disc, a flexible disc, a CD-ROM, an MO, and a DVD and is read out of the recording medium by the computer to execution. The program may be a transporting medium which can be distributed through a network such as Internet.

The present disclosure relates to the subject matter contained in Japanese patent application No. 2006-007156 filed on Jan. 16, 2006, which are expressly incorporated herein by reference in its entirety.

What is claimed is:

1. A print job management device comprising:
   a print job receiver, operable to receive a print job including print setting information on a setting of a printing operation to be executed by a printing device from a print job preparing device for preparing the print job;
   an acquirer, operable to acquire device status information on a status of the printing device from the printing device; and
   a print job issuer, operable to determine, based on the print setting information and the device status information, whether the printing operation can be performed by the printing device, the print job issuer issuing the print job to the printing device when the print job issuer determines that the printing operation cannot be performed by the printing device and the device status information indicates a predetermined status regarding a feed path and a printing medium of the printing device;
   wherein the print job issuer issues the print job when the print job issuer determines that the printing operation cannot be performed by the printing device, each of a feed path indicated by the print setting information and the feed path indicated by the device status information is a manual feed path, and the device status information indicates no printing medium in the printing device;
   wherein the print job management device further comprises a display operable to display a picture for explaining a manual printing operation when the print job issuer issues the print job to the printing device and the feed path indicated by the print setting information is the manual feed path.

2. The print job management device according to claim 1, wherein
   the print job issuer pauses or stops issuing the print job to the printing device when the print job issuer determines that the printing operation cannot be performed by the printing device and the device status information does not indicate the predetermined status.

3. The print job management device according to claim 1, wherein
   the print job issuer issues the print job when the print job issuer determines that the printing operation cannot be performed by the printing device, each of the feed path indicated by the print setting information and the feed path indicated by the device status information is the manual feed path, and the device status information indicates a status in which a printing medium pressing mechanism is opened in the printing device.

4. The print job management device according to claim 1, wherein
   the print job issuer issues the print job, job when the print job issuer determines that the printing operation cannot be performed by the printing device, each of the feed path indicated by the print setting information and the feed path indicated by the device status information is the manual feed path, and the device status information indicates an insertion failure status of the printing medium in the printing device.

5. The print job management device according to claim 1, wherein
   the print job issuer searches for and extracts a printing device which is in a printable status, based on the print setting information and the device status information acquired by the acquirer, from among a plurality of printing devices, and issues the print job to the extracted printing device.

6. A print job management method comprising:
receiving a print job including print setting information on a setting of a printing operation to be executed by a printing device from a print job preparing device for preparing the print job;
acquiring device status information on a status of the printing device from the printing device; and
determining whether the printing operation can be executed by the printing device, based on the print setting information and the device status information, and issuing the print job to the printing device when it is determined that the printing operation cannot be performed by the printing device and the device status information indicates a predetermined status regarding a feed path and a printing medium of the printing device;
wherein the print job is issued when the printing operation is determined to not be able to be performed by the printing device, each of a feed path indicated by the print setting information and the feed path indicated by the device status information is a manual feed path, and the device status information indicates no printing medium in the printing device;
wherein a picture for explaining a manual printing operation is displayed when the print job is issued to the printing device and the feed path indicated by the print setting information is the manual feed path.

7. A computer-readable recording medium in which a print job management program allowing a computer to execute the print job management method according to claim 6 is recorded.

8. The print job management method according to claim 6, wherein
the issuing of the print job is paused or stopped when it is determined that the printing operation cannot be performed by the printing device and the device status information does not indicate the predetermined status.

9. The print job management method according to claim 6, wherein
the print job is issued when it is determined that the printing operation cannot be performed by the printing device, each of the feed path indicated by the print setting information and the feed path indicated by the device status information is the manual feed path, and the device status information indicates a status in which a printing medium pressing mechanism is opened in the printing device.

10. The print job management method according to claim 6, wherein
the print job is issued when it is determined that the printing operation cannot be performed by the printing device, each of the feed path indicated by the print setting information and the feed path indicated by the device status information is the manual feed path, and the device status information indicates an insertion failure status of the printing medium in the printing device.

11. The print job management method according to claim 6, further comprising
searching for and extracting a printing device which is in a printable status, based on the print setting information and the device status information, from among a plurality of printing devices, and issuing the print job to the extracted printing device.

* * * * *